US012679202B2

(12) United States Patent
Oh

(10) Patent No.: US 12,679,202 B2
(45) Date of Patent: Jul. 14, 2026

(54) METHOD OF CONTROLLING TORQUE OF DRIVE SYSTEM OF ELECTRIC VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 162 days.

(21) Appl. No.: 18/236,620

(22) Filed: Aug. 22, 2023

(65) Prior Publication Data

US 2024/0317050 A1 Sep. 26, 2024

(30) Foreign Application Priority Data

Mar. 22, 2023 (KR) ........................ 10-2023-0037015

(51) Int. Cl.
| | |
|---|---|
| *B60K 17/00* | (2006.01) |
| *B60K 17/354* | (2006.01) |
| *B60K 17/356* | (2006.01) |
| *B60K 23/08* | (2006.01) |
| *B60L 7/26* | (2006.01) |
| *B60T 7/12* | (2006.01) |
| *F16H 57/12* | (2006.01) |

(52) U.S. Cl.
CPC ........ *B60K 23/0808* (2013.01); *B60K 17/354* (2013.01); *B60K 17/356* (2013.01); *B60L 7/26* (2013.01); *B60T 7/12* (2013.01); *F16H 57/12* (2013.01); *B60K 2023/0858* (2013.01); *F16H 2057/123* (2013.01)

(58) Field of Classification Search
None
See application file for complete search history.

(56) References Cited

U.S. PATENT DOCUMENTS

| | | | |
|---|---|---|---|
| 2011/0029172 A1* | 2/2011 | Kwon ................. | B60L 15/2009 |
| | | | 318/452 |
| 2015/0360682 A1* | 12/2015 | Ooshima .............. | B60W 10/02 |
| | | | 903/914 |
| 2017/0334432 A1 | 11/2017 | Kawai et al. | |

(Continued)

FOREIGN PATENT DOCUMENTS

| | | |
|---|---|---|
| JP | 2008-024022 A | 2/2008 |
| JP | 2008-167612 A | 7/2008 |

(Continued)

*Primary Examiner* — James M McPherson
(74) *Attorney, Agent, or Firm* — MORGAN, LEWIS & BOCKIUS LLP

(57) ABSTRACT

A method of controlling torque of a drive system of an electric vehicle is to provide a drive system torque command generation and torque control method of an electric vehicle capable of generating torque and improving vehicle responsiveness and behavioral responsiveness. The method of controlling torque of a drive system of an electric vehicle includes performing backlash control for limiting a torque slope of a front wheel torque command while the front wheel torque command passes through a backlash band, which is a torque region where there is possibility that backlash occurs in a front wheel-side drive system, and generating a braking torque command for generating a friction braking torque while the backlash control is performed.

19 Claims, 11 Drawing Sheets

(56)     References Cited

U.S. PATENT DOCUMENTS

| | | | | |
|---|---|---|---|---|
| 2018/0072306 A1 * | 3/2018 | Yamazaki | ................ | B60K 6/54 |
| 2018/0162365 A1 | 6/2018 | Kim et al. | | |
| 2018/0312078 A1 * | 11/2018 | Message | ............ | B60L 15/2063 |
| 2019/0293172 A1 * | 9/2019 | Shinohara | ............. | B60K 17/02 |
| 2020/0231048 A1 * | 7/2020 | Gauthier | ................. | B60L 15/34 |
| 2020/0269846 A1 * | 8/2020 | Engman | ................ | B60W 20/19 |
| 2020/0346549 A1 * | 11/2020 | Ko | ........................... | B60L 15/20 |
| 2020/0391598 A1 * | 12/2020 | Lee | .......................... | H02P 6/08 |
| 2021/0171012 A1 * | 6/2021 | Ravichandran | ........ | B60K 6/485 |
| 2022/0135021 A1 | 5/2022 | Furuta | | |
| 2023/0249667 A1 * | 8/2023 | Ito | ........................ | B60W 20/13 |
| | | | | 701/22 |
| 2025/0065881 A1 * | 2/2025 | Shen | .................... | B60W 10/08 |

FOREIGN PATENT DOCUMENTS

| | | | |
|---|---|---|---|
| JP | 2017-105442 A | 6/2017 |
| JP | 2018-095246 A | 6/2018 |
| KR | 10-1448746 B | 10/2014 |
| KR | 10-1704243 B | 2/2017 |
| KR | 2022-0096746 A | 7/2022 |

* cited by examiner

SLACK

BACKLASH

METHOD OF CONTROLLING TORQUE OF DRIVE SYSTEM OF ELECTRIC VEHICLE

CROSS-REFERENCE TO RELATED APPLICATION

The present application claims priority to Korean Patent Application No. 10-2023-0037015 filed on Mar. 22, 2023, the entire contents of which is incorporated herein for all purposes by this reference.

BACKGROUND OF THE PRESENT DISCLOSURE

Field of the Present Disclosure

The present disclosure relates to a method of controlling torque of a drive system of an electric vehicle. More particularly, it relates to a torque control method capable of generating torque by evading a backlash band of a drive system in an electric vehicle and improving vehicle responsiveness and behavioral responsiveness.

Description of Related Art

In general, the drive system of a vehicle needs to generate appropriate torque according to a torque command determined by a driving input value of a driver (for example, an accelerator pedal input value, a brake pedal input value, etc.) or a request of an advanced driver assistance system (ADAS).

At the present time, when a torque change rate is set to be excessively high, there may be problems such as driveshaft torsion, gear backlash hit, or impulsive drivability deterioration due to rapidly changing torque.

Conversely, when the torque change rate is excessively small, it takes excessive time for the driver or an ADAS controller to provide the required torque, and actual behavior of the vehicle differs from intention of the driver, causing frustrating responsiveness or dangerous situations.

Accordingly, there is a trade-off between a degree of reduction in Noise, Vibration, and Harshness (NVH) in the vehicle due to rapid torque change and a degree of ensuring acceleration/deceleration responsiveness of the vehicle.

In current mass-produced vehicles, slope limiting and filters using various conditions as factors are used to generate optimal torque commands capable of solving such trade-off.

Furthermore, in an electrified vehicle using a motor as a driving source or a part thereof, active feedback torque compensation control capable of suppressing vibration that has previously occurred using a motor may be applied.

However, even when advanced backlash post-correction control is applied, it is difficult to suppress a problem of deterioration in vehicle responsiveness, which inevitably occurs chronically due to characteristics of hardware. Moreover, NVH issues due to backlash frequently occur in an electric vehicle including few vibration damping elements in a drive system.

Generally, a method of generating a model speed of a driveshaft using a disturbance observer and reducing vibration using a deviation between the model speed and an actual speed of the driveshaft is disclosed. Also a method of calculating a model speed based on a wheel speed instead of the disturbance observer in determining the model speed, is disclosed.

Generally, a method of generating a model speed of a motor using an input torque model and reducing vibration using a deviation between the model speed and an actual speed of the motor, is disclosed.

Generally, a method of estimating a speed of a drive system using a torque model and determining a slope of a torque command using a difference between an actual speed and the estimated speed of the drive system, is disclosed.

However, all of the above conventional technologies only suggest a torque compensation method for reducing and suppressing vibration generated in a drive system, and fail to suggest a torque determination method capable of preventing occurrence of vibration itself in advance.

Therefore, in relation to the backlash of the drive system, there is a demand for a control method capable of generating a torque command by evading a backlash band in which backlash of the drive system may occur, rather than a control method that alleviates a problem caused by the backlash.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a torque command generation and torque control method for a drive system of an electric vehicle configured for generating torque by evading a backlash band to prevent backlash from occurring in the drive system and improving responsiveness and behavioral responsiveness of a vehicle.

The object of the present disclosure is not limited to the object mentioned above, and other objects not mentioned herein may be clearly understood by those of ordinary skill in the art to which an exemplary embodiment of the present disclosure belongs (hereinafter referred to as "person of ordinary skill") from the description below.

Various aspects of the present disclosure are directed to providing a method of controlling torque of a drive system of an electric vehicle, the method including determining, by a controller, a required torque according to a vehicle driving state while the vehicle is driven, and determining a total torque command based on the determined required torque, and performing, by the controller, a front wheel and rear wheel torque distribution process on the total torque command, so that a front wheel torque command and a rear wheel torque command following the total torque command are determined, wherein the controller is configured to perform backlash control for limiting a torque slope of the front wheel torque command while the front wheel torque command passes through a backlash band, which is a torque region where there is possibility that backlash occurs in a front wheel-side drive system, and generates a braking torque command for generating a friction braking torque while the backlash control is performed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

Figure 1:
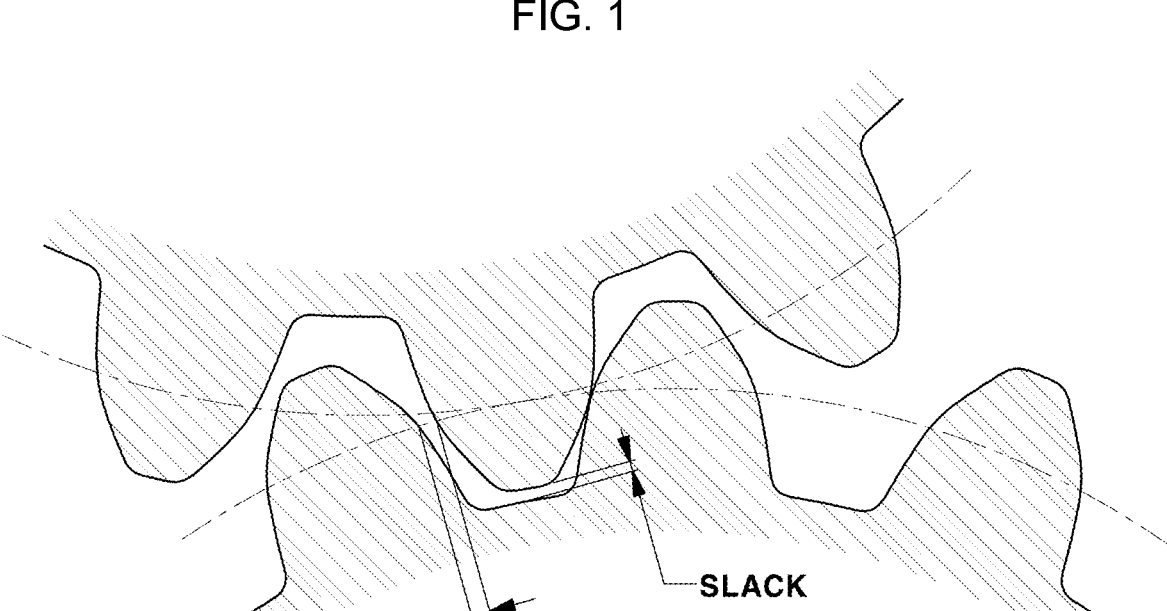
FIG. 1 is a diagram illustrating backlash.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings. Specific structural or functional descriptions presented in the exemplary embodiments of the present disclosure are only illustrative for describing embodiments according to the concept of the present disclosure, and the exemplary embodiments according to the concept of the present disclosure may be implemented in various forms. Furthermore, the present disclosure should not be construed as being limited to the exemplary embodiments described herein, and should be understood to include all modifications, equivalents, and substitutes included in the spirit and scope of the present disclosure.

Meanwhile, in an exemplary embodiment of the present disclosure, even though terms such as "first", "second", etc. may be used to describe various elements, the elements are not limited by these terms. These terms are only used to distinguish one element from another. For example, within the scope not departing from the scope of the rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to", should be interpreted similarly.

Like reference numerals refer to like elements throughout. The terminology used herein is for describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Various embodiments of the present disclosure relates to a method of controlling torque of a drive system of an electric vehicle, and relates to a control method configured for generating a torque command by evading a backlash band in which backlash in the drive system may occur rather than a control method for mitigating a problem caused by backlash in the drive system.

Various aspects of the present disclosure are directed to providing a drive system torque command generation and torque control method configured for improving vehicle responsiveness and tip-in and tip-out responsiveness.

In an exemplary embodiment of the present disclosure, a backlash band may be defined as a torque region in which backlash may occur in a drive system of a vehicle. Here, the drive system of the vehicle includes drive elements such as a driveshaft between a drive device and drive wheels, a reducer, a differential, and an axle in addition to the drive device and the drive wheels for driving the vehicle.

In an exemplary embodiment of the present disclosure, "torque" encompasses both driving torque for accelerating the vehicle and braking torque for decelerating the vehicle. Herein, "braking torque" (deceleration torque) encompasses regenerative braking torque by a motor and friction braking torque by a friction braking device.

However, when a front wheel torque command and a rear wheel torque command indicate negative (−) values, the front wheel torque command and the rear wheel torque command indicating negative values refer to regenerative braking torque commands, and in FIG. 3, FIG. 4, FIG. 5, FIG. 6, FIG. 7, FIG. 8, FIG. 9, FIG. 10 and FIG. 11 described later, a "braking torque command" refers to a friction braking torque command.

Unless otherwise specified in the present specification as being divided into driving torque and braking torque, torque may be a driving torque for accelerating the vehicle (acceleration situation) or a braking torque for decelerating the vehicle (deceleration situation) depending on the driving situation of the vehicle.

In an exemplary embodiment of the present disclosure, the driving torque and a driving torque command each include a torque value for accelerating the vehicle, which is defined as a positive (+) torque value. On the other hand, the braking torque and the braking torque command each include a torque value for decelerating the vehicle, which is defined as a negative (−) torque value.

As described above, when the vehicle is driving, positive (+) torque, which is forward torque, or negative (−) torque, which is reverse torque, is applied to the drive system depending on whether the vehicle is accelerating or decelerating, and a direction of the torque applied from the motor to the drive system and transmitted through the drive system may change depending on the driving situation of the vehicle.

The present disclosure has been generated based on the principle that a problem caused by backlash in the drive system of the vehicle mainly occur only in a torque region close to 0, and the torque region close to 0 may be referred to as a backlash band where a backlash problem may occur.

In an exemplary embodiment of the present disclosure, the backlash band includes a backlash band of a front wheel-side drive system, which is a torque region in which backlash may occur in the front wheel-side drive system, and a backlash band of a rear wheel-side drive system, which is a torque region in which backlash may occur in the rear wheel-side drive system.

In an exemplary embodiment of the present disclosure, the backlash band of the front wheel-side drive system and the backlash band of the rear wheel-side drive system may be set to a torque range bordering a lower threshold value, which is a negative (−) value, and an upper limit threshold value, which is a positive value (+).

That is, the backlash band may be set to a torque range including 0, and a backlash state may occur when input torque applied from the motor, which is the drive device, to the drive system enters the set backlash band.

Backlash is a tolerance that exists between meshing teeth of two gears as illustrated in FIG. 1. Between two meshed gears, vibration or noise may occur as gear teeth strike each other due to backlash, and in the worst case, backlash may cause gear damage.

When torque is continuously applied in one direction, one of the two meshed gears continues to transmit force to the other in the same direction. Thus, the teeth of the two meshed gears are aligned and meshed in a forward direction, and at the instant time, a problem due to backlash tolerance does not occur.

However, when the direction of the torque is changed, the teeth of the gear reversely align after experiencing a backlash tolerance as a direction of force transmission is reversed. At the instant time, after alignment in the reverse direction is performed, while the force in the same direction is continuously transmitted, meshing of the gears is not released again, and thus a problem due to backlash does not occur.

However, at the moment when the direction of the transmitted force is changed again, a problem due to backlash occurs when meshing between the teeth of the two gears is released and then meshing is performed again while passing the meshing tolerance.

Therefore, a core of a method for not causing the backlash problem is to eliminate or minimize a situation of releasing gear engagement, which may be achieved by eliminating or minimizing a direction change of a torque command with respect to the drive device such as the motor.

To minimize the direction change of the torque command, front and rear wheel drive devices, that is, a front wheel motor and a rear wheel motor, need to share functions, which may limit maximum acceleration performance.

Figure 2:
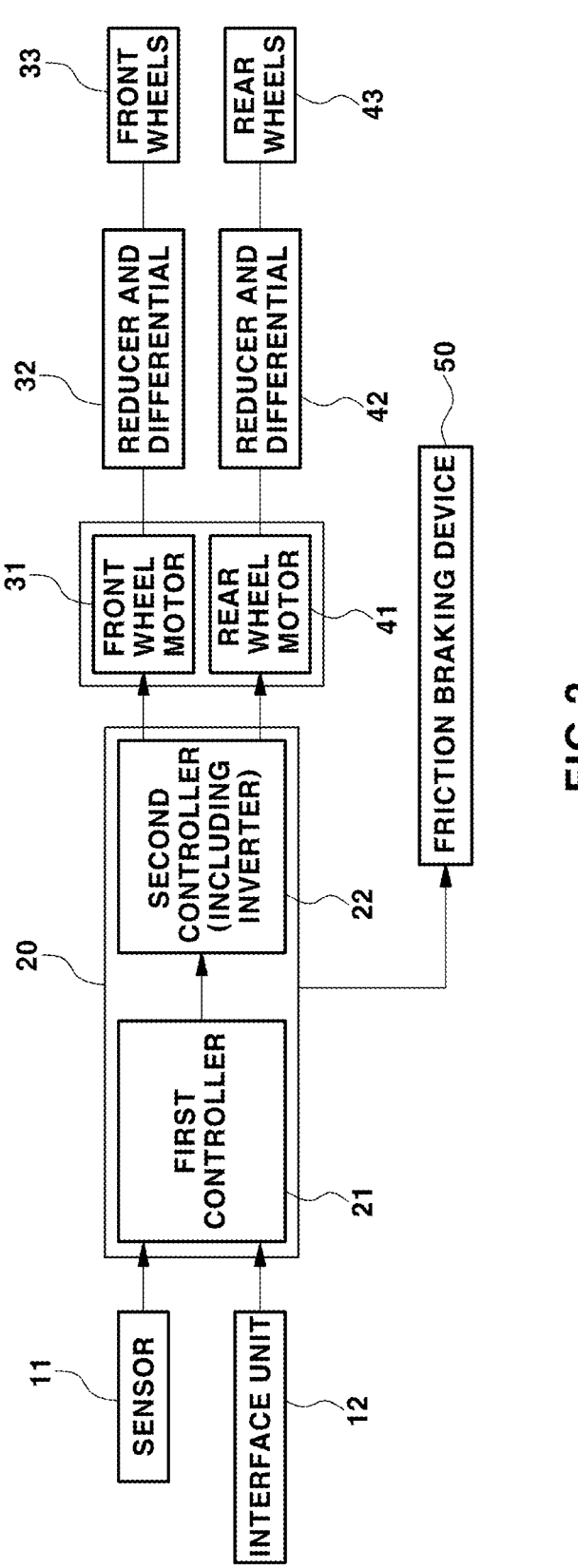
FIG. 2 is a block diagram illustrating a configuration of a device configured for performing a drive system torque control process according to various exemplary embodiments of the present disclosure.
Figure 3:
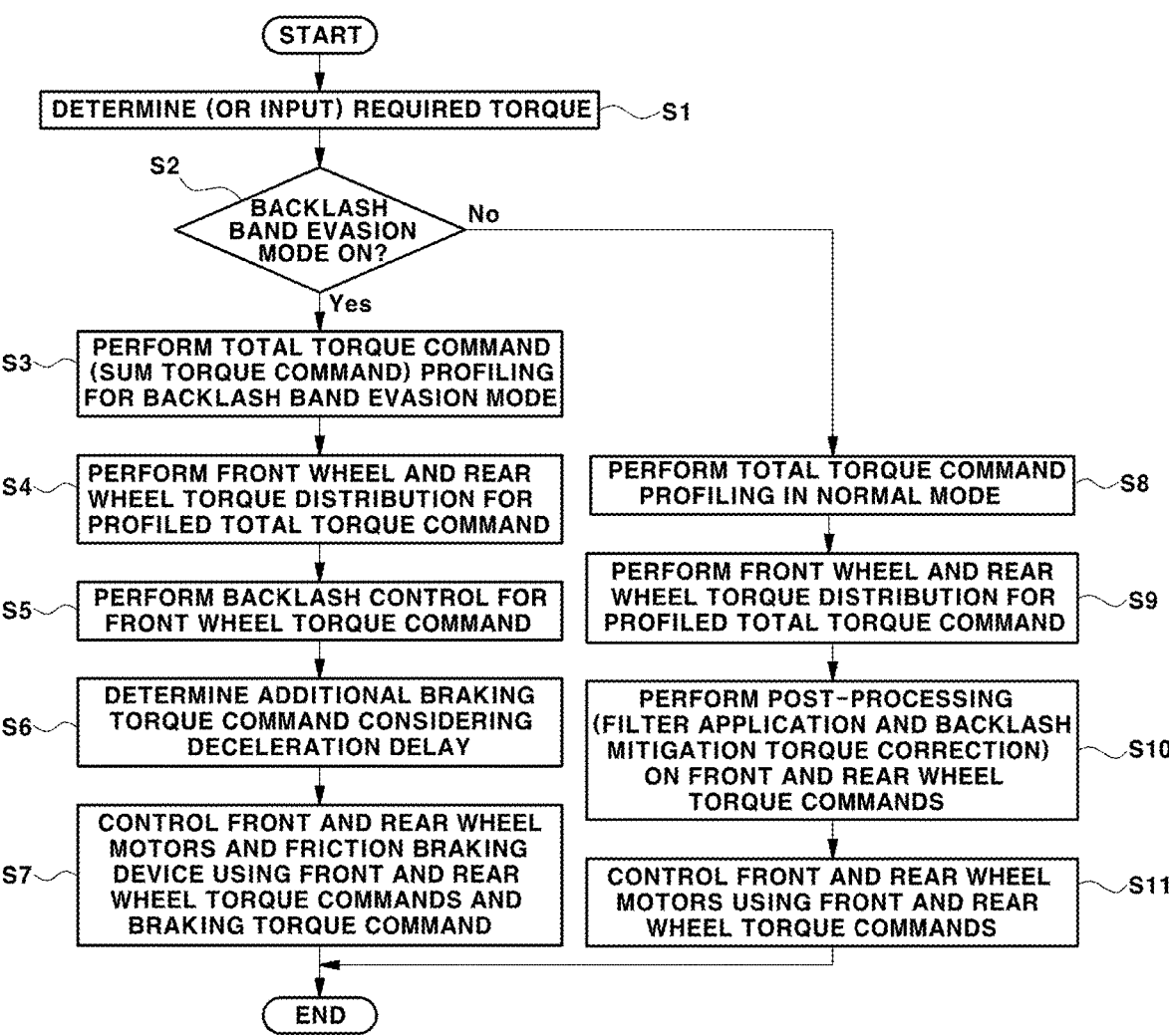
FIG. 3 is a flowchart illustrating the drive system torque control process according to various exemplary embodiments of the present disclosure.

FIG. 2 is a block diagram illustrating a configuration of a device configured for performing a drive system torque control process according to various exemplary embodiments of the present disclosure, and FIG. 3 is a flowchart illustrating the drive system torque control process according to various exemplary embodiments of the present disclosure.

The present disclosure may be applied to a vehicle provided with a plurality of drive devices, and may be applied to a vehicle in which front wheels 33 and rear wheels 43 are driven by independent drive devices, respectively. Furthermore, the present disclosure may be applied to an electric vehicle that runs using motors 31 and 41 as the drive devices.

The present disclosure may be applied to a vehicle provided with a front wheel drive device configured for applying torque to the front wheels 33 and a rear wheel drive device configured for applying torque to the rear wheels 43. Furthermore, the present disclosure may be applied to a vehicle in which both the front wheel drive device and the rear wheel drive device are motors. In the following description, the motor 31 driving the front wheels 33 will be referred to as a "front wheel motor" and the motor 41 driving the rear wheels 43 will be referred to as a "rear wheel motor".

Referring to FIG. 2, the front wheel motor 31 and the rear wheel motor 41 are illustrated as drive devices of the electric vehicle. The front wheel motor 31 and the rear wheel motor 41 are connected to the front wheels 33 and the rear wheels 43 provided as drive wheels through drive system elements such as reducers, differentials 32 and 42, and axles, respectively, so that power may be transmitted.

Accordingly, torque output from the front wheel motor 31 and the rear wheel motor 41 may be transmitted to the front wheels 33 and the rear wheels 43 through drive system elements such as the reducers, the differentials 32 and 42, and the axles, respectively.

Furthermore, although not separately illustrated in FIG. 2, a battery is connected to the front wheel motor 31 and the rear wheel motor 41 via an inverter so that the battery may be charged and discharged. The inverter may include a front wheel inverter for driving and controlling the front wheel motor 31 and a rear wheel inverter for driving and controlling the rear wheel motor 41.

In the electric vehicle, the front wheel motor 31 and the rear wheel motor 41 operate using power from the battery, and the battery is connected to the front wheel motor 31 and the rear wheel motor 41 via the front wheel inverter and the rear wheel inverter so that the battery may be charged and discharged.

In the electric vehicle, operations (driving and regeneration) of the front wheel motor 31 and the rear wheel motor 41 are controlled according to torque commands generated by a controller 20. At the instant time, the controller 20 is configured to determine required torque according to a vehicle driving state to drive the vehicle, and generates a final torque command (total torque command) based on the determined required torque.

Furthermore, the controller 20 is configured to control the operations of the front wheel motor 31 and the rear wheel motor 41 through the inverter according to the final torque command. In the following description, when the torque command is a positive (+) value, the torque command is defined as a driving torque command, and when the torque command is a negative (−) value, the torque command is defined as a regenerative braking torque command.

Furthermore, the final torque command is a pre-distribution torque command before torque distribution to the front and rear wheels, and in the following description, pre-distribution torque command, sum torque command, and total torque command are used interchangeably.

In an exemplary embodiment of the present disclosure, the controller 20 may include a first controller 21 that is configured to determine required torque based on a driving input value of the driver or receives required torque from another controller such as an ADAS controller, and generates and outputs a final torque command based on the required torque, and a second controller 22 that is configured to control the operations of the front wheel motor 31 and the rear wheel motor 41 according to the final torque command input from the first controller 21.

The first controller 21 may be a vehicle control unit (VCU) that is configured to determine and generates a torque command for controlling an operation of a motor in a typical vehicle. Because a method and process for determining a torque command in a vehicle are well-known technical matters in the field of the present disclosure, a detailed description thereof will be omitted.

Furthermore, the first controller 21 may be configured to determine the front wheel torque command and the rear wheel torque command from the final torque command through a front wheel and rear wheel torque distribution process. Accordingly, when the front wheel torque command and the rear wheel torque command are output from the first controller 21, the second controller 22 receives the front wheel torque command and the rear wheel torque command, and operates the front wheel motor 31 and the rear wheel motor 41 through the front wheel inverter and the rear wheel inverter.

The second controller 22 may be a general motor control unit (MCU) that is configured to control an operation of a driving motor through the inverter according to a torque command output from the VCU in the electric vehicle.

In the above description, a control subject is divided into the first controller 21 and the second controller 22. However, the torque control process according to an exemplary embodiment of the present disclosure may be performed by one integrated control element instead of a plurality of controllers.

A plurality of controllers and one integrated control element may be collectively referred to as a controller, and the torque control process according to an exemplary embodiment of the present disclosure described below may be performed by the present controller.

In an exemplary embodiment of the present disclosure, vehicle driving information, such as a driving input value of the driver input to the controller 20, is information indicating a vehicle driving state, and may include sensor detection information detected by a sensor 11 and input to the controller through a vehicle network.

At the present time, the sensor 11 for detecting the vehicle driving information may include an accelerator position sensor (APS) for detecting an accelerator pedal input value (APS value, %) of the driver, a brake pedal position sensor (BPS) for detecting a brake pedal input value (BPS value, %) of the driver, a sensor configured for detecting a drive system speed, and a sensor configured for detecting a vehicle speed.

Here, the drive system speed may be a rotation speed of the front wheel motor 31 and the rear wheel motor 41, which are driving motors, or a rotation speed (wheel speed) of the drive wheels 33 and 43. At the instant time, the sensor configured for detecting the drive system speed may be a sensor configured for detecting the rotation speed of each of the motors 31 and 41, which may be a normal resolver for detecting a rotor position of the motor. Alternatively, the sensor configured for detecting the drive system speed may be a wheel speed sensor configured for detecting the rotation speed (wheel speed) of the drive wheels 33 and 43.

Furthermore, the sensor configured for detecting the vehicle speed may also be a wheel speed sensor. Obtaining the vehicle speed information from a signal of the wheel speed sensor is a well-known technical matter in the field of the present disclosure, and thus a detailed description thereof will be omitted.

The accelerator pedal input value (APS value, %) of the driver, the brake pedal input value (BPS value, %) of the driver, the speed (rotation speed) of the drive motors 31 and 41, the vehicle speed, etc. may be selectively used as the vehicle driving information for determining and generating the required torque and torque command in the controller 20, which is detected by the sensor 11.

In the vehicle driving information, the accelerator pedal input value and the brake pedal input value, which are pedal input values of the driver, may be referred to as driving input information of the driver, and the speed and vehicle speed of the driving motor detected by the sensor 11 may be referred to as vehicle state information.

Furthermore, the vehicle driving information may include information independently determined by the controller 20 in a broad sense, and furthermore, may include information (for example, required torque information) input to the controller 20 from another controller (for example, the ADAS controller) in the vehicle through the vehicle network.

In FIG. 2, reference numeral 12 denotes an interface unit connected to the controller 20 in the vehicle, and the interface unit 12 may include an input device and an output device. In an exemplary embodiment of the present disclosure, the interface unit 12 is provided to enable driver operation, input, selection, and display of various information, and may be used to perform an ON/OFF operation of a backlash band evasion mode (responsiveness priority mode) described later, or provide various user interfaces (UIs).

In an exemplary embodiment of the present disclosure, the input device and the output device of the interface unit 12 may be selected from known devices so long as the input device and the output device can perform the ON/OFF operation of the backlash band evasion mode, and input or display various information.

For example, the interface unit 12 may include an operating device such as a button or switch provided in the vehicle, an input device or a display device of an audio, video, navigation (AVN) system, or a touch screen.

In FIG. 2, reference numeral 50 denotes a friction braking device of the vehicle, which may be a conventional hydraulic braking device, and may be a rear wheel friction braking device that applies friction braking torque to the rear wheels 43 as a more specific example.

Meanwhile, various aspects of the present disclosure are directed to providing a method configured for generating a torque command by evading the backlash band in which backlash in the drive system may occur. Here, evasion of the backlash band means maximally preventing a situation in which the torque command invades the backlash band.

This may be achieved by a method in which front wheel torque (which means actual torque) and a front wheel torque command maintain only negative (−) torque values, and rear wheel torque (which means actual torque) and a rear wheel torque command maintain only positive (+) torque values because the backlash issue is characterized by occurring when the direction of torque is changed as mentioned earlier.

However, when the front wheel torque command and the rear wheel torque command are limited so that the front wheel torque command and the rear wheel torque command have opposite signs between negative (−) and positive (+) signs, it may be difficult to satisfy the required torque with the torque of the front wheel motor 31 and the torque of the rear wheel motor 41.

Therefore, in an exemplary embodiment of the present disclosure, a control method of maintaining only a positive (+) torque value is applied only to the case of the rear wheel torque command to evade the backlash band, and at the instant time, the front wheel torque command is determined and operated in the total torque range as needed.

When the present control method is applied, the rear wheel motor 41 side continuously aligns gears in a positive (+) torque transmission direction in order not to enter the backlash band, which may be achieved by continuously generating at least a small amount of positive (+) directional torque.

At the present time, the small amount of positive (+) directional torque for continuously aligning the gears in the positive (+) torque transmission direction may be defined as a minimum torque threshold value (which is a positive value), and accordingly, a value of the rear wheel torque command (positive value) is determined in a region equal to or greater than the minimum torque threshold value set as a positive (+) torque value.

In an exemplary embodiment of the present disclosure, the minimum torque threshold value is set in the controller 20 as a torque value outside the backlash band, which is a torque region in which backlash may occur in the rear wheel-side drive system. That is, the minimum torque threshold value may be set to a value greater than an upper limit threshold value of the backlash band of the rear wheel-side drive system.

On the other hand, in an exemplary embodiment of the present disclosure, the front wheel motor 31 side does not continuously align gears only in a negative (−) torque transmission direction, and the front wheel motor 31 is not controlled so that the front wheel motor 31 generates only negative (−) torque.

That is, the front wheel motor 31 may be controlled so that the front wheel motor 31 selectively performs driving to accelerate the vehicle or performs regeneration to decelerate the vehicle according to the total torque command (sum torque command) finally determined from the required torque.

In the present way, unlike the rear wheel motor 41 which is controlled so that the rear wheel motor 41 generates positive (+) torque, specifically, at least the minimum torque threshold value or more, which is a positive (+) torque value, the front wheel motor 31 may be controlled so that the front wheel motor 31 generates a negative (−) torque value or generates positive (+) torque.

However, when the vehicle decelerates after tip-out in which the driver removes a foot from the accelerator pedal, the rear wheel motor 41 cannot perform regenerative braking and is controlled so that the rear wheel motor 41 generates torque greater than or equal to the minimum torque threshold value, which is a positive (+) torque value at all times. At the instant time, because backlash control is performed while passing through the backlash band for the front wheel torque command, which has been a positive (+) torque value, it is difficult to satisfy the required torque during deceleration, that is, required total braking torque (deceleration torque) using only regenerative braking torque by the front wheel motor 31.

Therefore, during backlash control passing through the backlash band of the front wheel-side drive system while the front wheel torque command is switched from positive (+) torque to negative (−) torque during vehicle deceleration, such as during coasting, control that separately compensates for insufficient braking torque is required.

To the present end, in an exemplary embodiment of the present disclosure, while the front wheel torque command passes through the backlash band during vehicle deceleration, such as during coasting, a hydraulic braking device, which is a friction braking device 50, is operated to compensate for the insufficient braking torque using the friction braking torque.

To limit the rear wheel torque command to the minimum torque threshold value during vehicle deceleration and at the same time compensate for deceleration delay and delay in braking torque change which may occur while the front wheel torque command passes through the backlash band, there is demand for a process of compensating for the insufficient braking torque using the friction braking device 50 to satisfy the total braking torque as the required torque.

Figure 4:
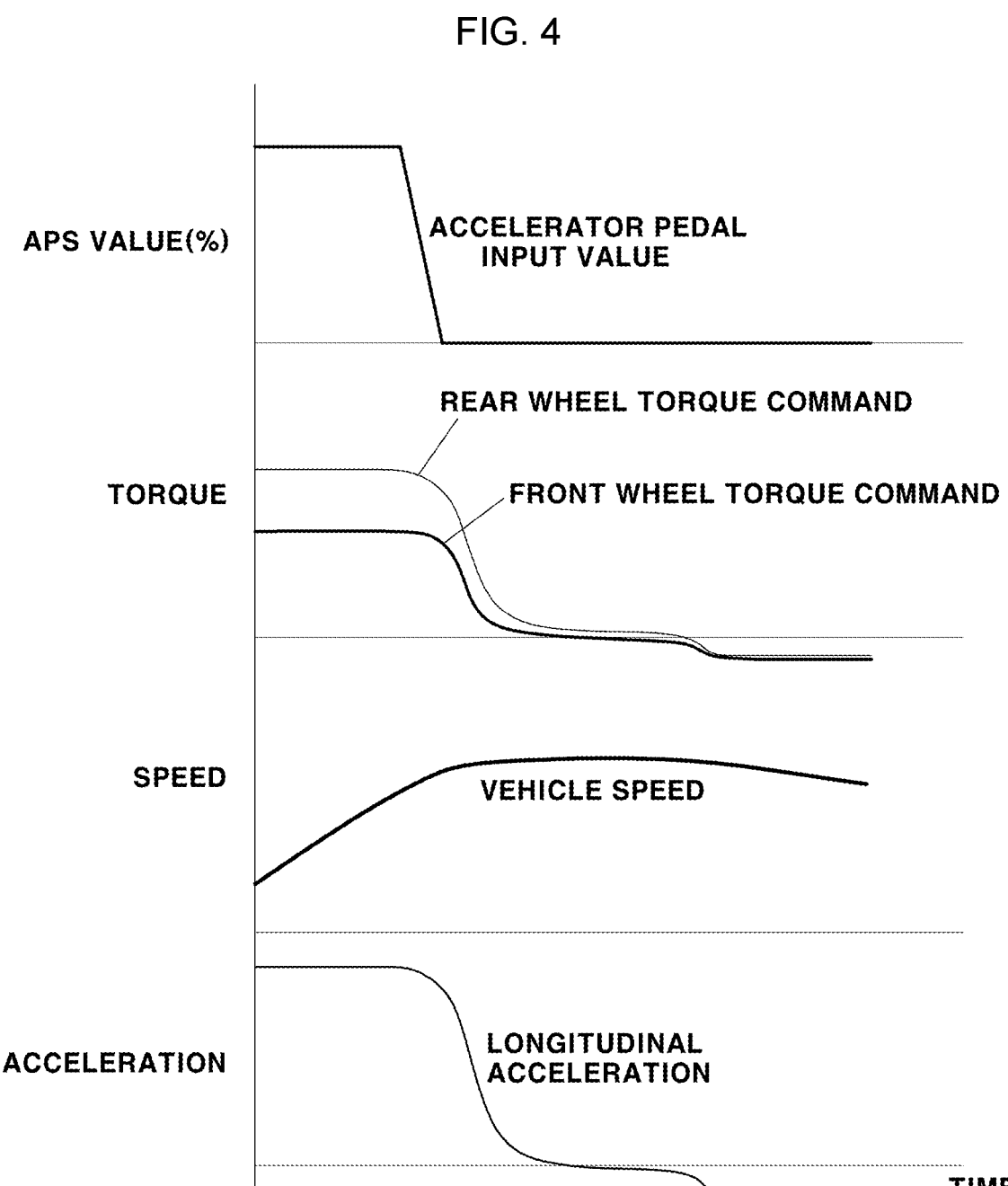
FIG. 4 is a diagram illustrating a distribution state of a front wheel torque command and a rear wheel torque command in a coasting deceleration situation in a normal mode in which a backlash band evasion mode is turned off in an exemplary embodiment of the present disclosure.

FIG. 4 is a diagram illustrating a distribution state of the front wheel torque command and the rear wheel torque command in a coasting deceleration situation of the vehicle in a normal mode. In an exemplary embodiment of the present disclosure, the normal mode may be selected when the driver turns off the backlash band evasion mode through the interface unit 12.

In an exemplary embodiment of the present disclosure, when the backlash band evasion mode is turned off, drive system torque control in the normal mode is performed. The normal mode has no difference compared to the conventional torque control mode.

The controller 20 is configured to determine the required torque by itself, as in the case of normal drive system torque control, or receives the required torque from another controller (step S1 in FIG. 3), verifies whether the backlash band evasion mode is in an OFF state (step S2 in FIG. 3), and is configured to perform profiling of the total torque command in the normal mode when the backlash band evasion mode is in the OFF state (step S8 in FIG. 3).

At the present time, as in the case of normal drive system torque control, the controller 20 is configured to determine the required torque by itself or receives the required torque from another controller, and then is configured to determine the total torque command based on the required torque.

Profiling the total torque command (sum torque command and pre-distribution torque command) and determining a final total torque command based on the required torque may be understood as including the same meaning.

Hereinafter, in the description of the present disclosure, the sum torque command means the total torque command, which is the pre-distribution torque command, and means the torque command obtained by summing the front wheel torque command and the rear wheel torque command (command including the summed torque value). In an exemplary embodiment of the present disclosure, a torque command for each wheel and a torque command for each axle refer to the front wheel torque command and the rear wheel torque command.

Furthermore, in the description of the present disclosure, invasion or entry into the backlash band means when the torque value of the corresponding torque command becomes a torque value within the backlash band, and passing through the backlash band means that the torque value of the torque command invades the backlash band outside the backlash band and then continuously increases or decreases, thus escaping the backlash band again.

The normal mode is a mode determined and operated in all torque ranges of positive (+) and negative (−) values according to the sum torque command, which is the pre-distribution torque command, to satisfy the required torque by the torque applied by the front wheel motor and the rear wheel motor.

As illustrated in FIG. 4, in the normal mode in which the backlash band evasion mode is turned off, upon tip-out in which the driver releases the accelerator pedal, both the front wheel torque command and the rear wheel torque command are switched from positive (+) torque values to negative (−) torque values. At the instant time, both the front wheel torque command and the rear wheel torque command inevitably pass through the backlash band.

While passing through the backlash band in the present way, the direction of the torque applied from the motor to the drive system is not rapidly changed so that the backlash problem may be minimized. That is, as illustrated in FIG. 4, the front wheel torque command and the rear wheel torque command are not switched from positive (+) torque to negative (−) torque immediately after tip-out of the accelerator pedal.

Furthermore, for a predetermined time period after tip-out, the front wheel torque command and the rear wheel torque command are determined so that the torque applied to the drive system by the motor may change direction while passing through the backlash band (step S9 in FIG. 3).

During a time when the backlash band is passed through as described above, torque slope control is performed to limit slopes of the front wheel torque command and the rear wheel torque command, so that the torque command is not rapidly decreased. Backlash control is performed so that a gentle torque change is made within the backlash band for the front wheel torque command and the rear wheel torque command.

To the present end, the controller 20 presets a maximum permissible change rate in the backlash band for the front wheel torque command and the rear wheel torque command to a small value that does not cause backlash impact.

Accordingly, while the front wheel torque command and the rear wheel torque command decrease and pass through the backlash band, the controller 20 is configured to determine that the front wheel torque command and the rear wheel torque command gradually change according to the maximum permissible change rate of the small value.

Furthermore, after the front wheel torque command and the rear wheel torque command pass through the backlash band, the controller 20 is configured to perform front wheel and rear wheel torque distribution to satisfy the regenerative braking torque required for coasting deceleration driving using the sum of the front wheel torque and the rear wheel torque (step S9 in FIG. 3).

That is, the front wheel torque command and the rear wheel torque command which may satisfy the regenerative braking torque command (pre-distribution torque command), which is the total torque command during coasting deceleration driving, are determined.

As described above, in the normal mode, when the driver tips-out the accelerator pedal and enters a deceleration situation, both the front wheel torque command and the rear wheel torque command are switched from positive (+) torque values to negative (−) torque values, and both the front wheel torque command and the rear wheel torque command pass through the backlash band when the torque direction is switched.

In the present normal mode, backlash control is performed to limit the slope to the maximum permissible change rate for both the front wheel torque command and the rear wheel torque command to minimize the problem caused by backlash, and thus the deceleration delay of the vehicle is inevitable in the backlash band.

When the front wheel torque command and the rear wheel torque command are determined through the front wheel and rear wheel torque distribution in the normal mode, post-processing may be performed on the determined front and rear wheel torque commands (Step S10 in FIG. 3). For example, a final front wheel torque command and a final rear wheel torque command may be determined by applying a filter to the commands and performing backlash mitigation torque correction.

Subsequently, when the final front wheel torque command and the final rear wheel torque command are determined, the controller 20 is configured to control the front wheel motor 31 and the rear wheel motor 41 according to the final front wheel torque command and the final rear wheel torque command (step S11).

Figure 5:
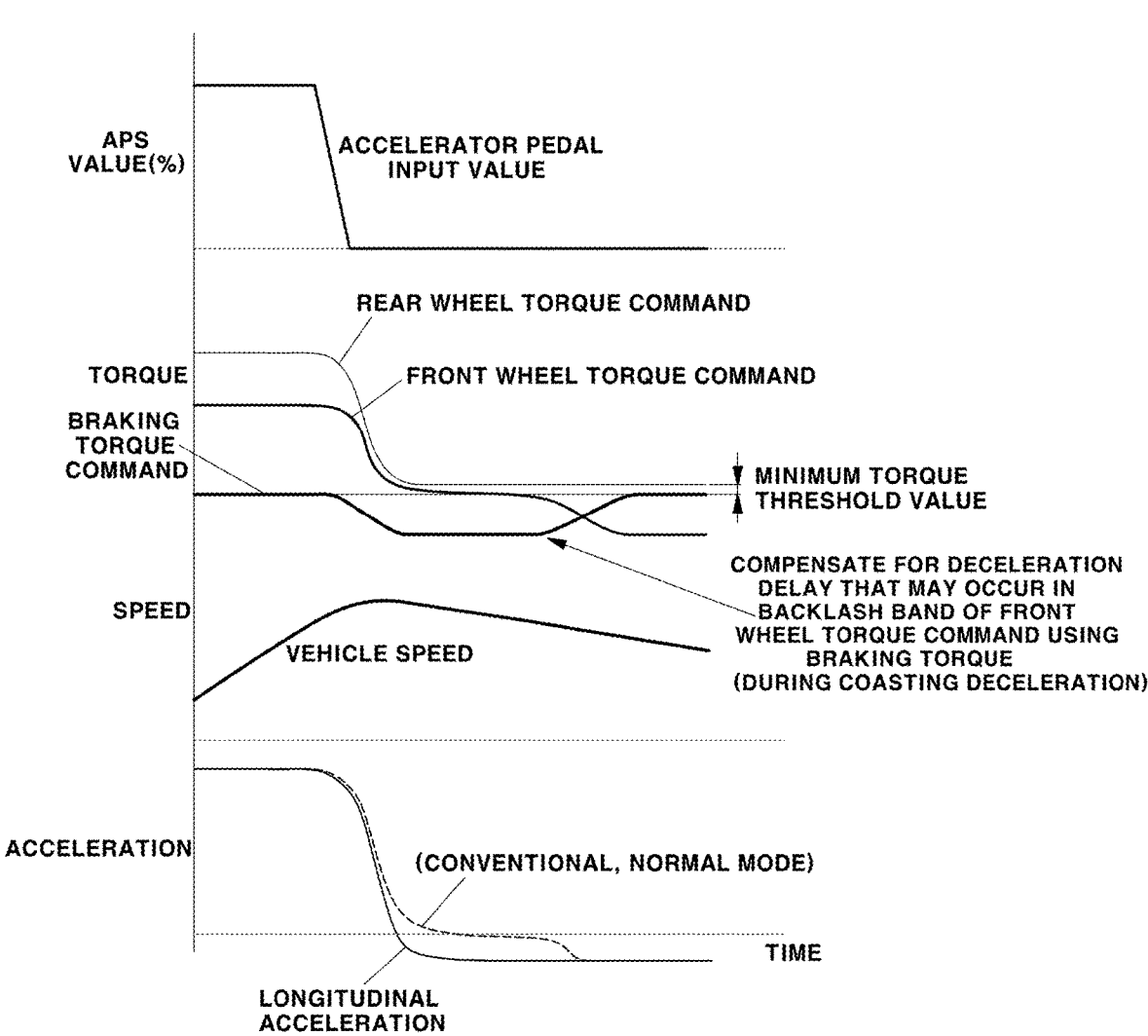
FIG. 5 is a diagram illustrating a torque control state according to various exemplary embodiments of the present disclosure.

FIG. 5 illustrates a torque control state according to various exemplary embodiments of the present disclosure, shows an example in which backlash band evasion control is performed, and is a diagram for describing a method of compensating for backlash delay using friction braking torque during deceleration.

In FIG. 5, "braking torque command" is a torque command for generating friction braking torque, which may be a braking torque command for applying friction braking torque to the rear wheels of the vehicle. The controller 20 is configured to control an operation of the friction braking device 50 in real time according to the braking torque command, and may be configured for controlling an operation of the rear wheel friction braking device as the friction braking device 50.

In various exemplary embodiments of the present disclosure, a mode in which backlash band evasion control is performed, that is, the backlash band evasion mode, may be selectively performed by operation of the driver. That is, when the driver turns on the interface unit 12, the controller 20 may enter the backlash band evasion mode by receiving an on signal output from the interface unit 12, and then perform backlash band evasion control.

Describing the process step by step, the controller 20 is configured to determine the required torque by itself or receives the required torque from another controller (step S1 in FIG. 3), and verifies whether the backlash band evasion mode is in the ON state (step S2 in FIG. 3).

When the backlash band evasion mode is in the ON state, the controller 20 is configured to determine the final total torque command (sum torque command as the pre-distribution torque command) based on the required torque, and is configured to perform a total torque command profiling process for a backlash evasion mode (step S3 in FIG. 3).

On the other hand, when the backlash band evasion mode is in an OFF state, the controller 20 is configured to perform a total torque command (sum torque command) profiling process for the normal mode based on the required torque using a normal method (step S8 in FIG. 3). A process in the normal mode thereafter is the same as described with reference to FIG. 4.

Thereafter, the controller 20 distributes the profiled total torque command into a front wheel torque command and a rear wheel torque command (Step S4 in FIG. 3). At the instant time, the rear wheel torque command is determined as a positive (+) torque value at all times, and even during vehicle deceleration, the rear wheel torque command is determined as a minimum torque threshold value set as a positive (+) torque value.

In a deceleration section where the vehicle is decelerating, such as during coasting after tip-out in which the driver releases the foot from the accelerator pedal, the total torque command finally determined from the required torque (sum torque command as the pre-distribution torque command) includes a negative (−) torque value.

Furthermore, even in the deceleration section where the vehicle is decelerating, the rear wheel torque command is determined as a positive (+) torque value at all times, and the front wheel torque command is switched from a positive (+) torque value to a negative (−) torque value while passing through the backlash band.

At the present time, when the total torque command (pre-distribution torque command and sum torque command) is smaller than the minimum torque threshold value, the rear wheel torque command is determined as the minimum torque threshold value, and the front wheel torque command may be determined as a value obtained by subtracting the rear wheel torque command from the total torque command.

As a result, the rear wheel motor 41 outputs positive (+) torque at all times and applies the positive (+) torque to the drive system. At the instant time, the torque direction of the front wheel motor 31 applied to the drive system is switched from positive (+) torque to negative (−) torque while passing through the backlash band.

In the present way, because the front wheel torque command needs to pass through the backlash band, backlash control for the front wheel torque command needs to be performed (Step S5 in FIG. 3). During backlash control during a time when the front wheel torque command passes through the backlash band, torque slope control is performed to limit a slope of the front wheel torque command so that the torque command does not rapidly decrease.

At the present time, the maximum permissible change rate within the backlash band of the front wheel torque command is preset in the controller 20 to a small value that does not cause backlash impact in the front wheel-side drive system. Thus, while the front wheel torque command decreases and passes through the backlash band, the controller 20 is configured to determine the slope of the front wheel torque command to be the maximum permissible change rate of the small value. Thus, while passing through the backlash band, the front wheel torque command is determined as a value that gently changes according to the maximum permissible change rate.

Accordingly, after passing through the backlash band, the controller 20 rapidly changes the front wheel torque command together with the rear wheel torque command to satisfy the regenerative braking torque required for coasting deceleration driving of the vehicle.

That is, even after the front wheel torque command passes through the backlash band, the rear wheel torque command continues to maintain the minimum torque threshold value set as a positive (+) torque value, and the braking torque command of the friction braking device 50, which has been additionally applied during backlash control, is set to 0) torque.

As a result, after the front wheel torque command passes through the backlash band, the friction braking torque by the friction braking device 50 is not generated, and coasting deceleration of the vehicle is achieved only by a regenerative braking torque by the front wheel motor 31 without interference of friction braking torque.

When the braking torque command becomes 0 torque, and interference of the friction braking torque is suspended, the front wheel torque command is determined as a value obtained by subtracting the rear wheel torque command (positive torque) maintaining the minimum torque threshold value from the total torque command (negative torque), which is the pre-distribution torque command. The front wheel torque command determined in the instant way includes a negative (−) torque value.

As described above, in an exemplary embodiment of the present disclosure, the controller is configured to compare the total torque command with the minimum torque threshold value, and is configured to determine the rear wheel torque command as the minimum torque threshold value when the total torque command is less than or equal to the minimum torque threshold value.

Furthermore, while the front wheel torque command passes through the backlash band, the sum of the rear wheel torque command, the front wheel torque command, and the braking torque command follows the total torque command, and after the front wheel torque command passes through the backlash band, generation of the braking torque command is suspended so that the sum of the rear wheel torque command and the front wheel torque command follows the total torque command.

Meanwhile, a process in which backlash control is performed while the front wheel torque command passes through the backlash band will be described in more detail.

After tip-out in which the driver releases the foot from the accelerator pedal, the rear wheel torque command decreases to the minimum torque threshold value, and the minimum torque threshold value includes a positive (+) torque value. Thus, after reaching the minimum torque threshold value, the rear wheel torque command continuously maintains positive (+) torque and does not pass through the backlash band.

On the other hand, the front wheel torque command is switched from a positive (+) torque value to a negative (−) torque value by passing through the backlash band, and even at the instant time, the rear wheel torque command continues to maintain the minimum torque threshold value.

Furthermore, while the front wheel torque command passes through the backlash band, the slope is limited to the maximum permissible change rate and gradually changes. Thus, during backlash control of the front wheel torque command (while the front wheel torque command passes through the backlash band), vehicle deceleration delay may occur due to lack of braking torque.

Accordingly, additional braking torque is applied and generated to compensate for insufficient braking torque so that deceleration delay does not occur while performing backlash control of the front wheel torque command.

At the present time, the controller 20 generates and outputs a braking torque command for applying friction braking torque through the friction braking device 50 (step S6 in FIG. 3), so that additional braking torque is generated by the friction braking device 50 (step S7 in FIG. 3).

At the present time, the braking torque command for compensating for the deceleration delay in the backlash band may be determined as a value obtained by subtracting the sum of the front wheel torque command and the rear wheel torque command during backlash control from the total torque command, which is the pre-distribution torque command (sum torque command).

That is, the braking torque command may be determined as a value of "(total torque command–[front wheel torque command+rear wheel torque command])." Here, the rear wheel torque command may be a value of the minimum torque threshold value, and in the instant case, the front wheel torque command is a value determined to change at a predetermined slope in the backlash band.

In the formula for determining the braking torque command, the front wheel torque command is a front wheel torque command passing through a backlash band, that is, a front wheel torque command corrected to mitigate backlash impact in consideration of backlash. Alternatively, instead of the compensated front wheel torque command, an actual front wheel torque value detected in real time by a separate sensor may be used as the front wheel torque command.

Furthermore, as described above, when the front wheel torque command passes through the backlash band, the braking torque command including the negative (–) value is changed at a predetermined positive (+) slope until reaching 0 torque, so that friction braking torque is not finally generated.

At the same time, the front wheel torque command is changed at a negative (–) slope in the opposite direction to increase the regenerative braking torque of the front wheels of the vehicle. When the braking torque command becomes 0 torque, the total torque command may be satisfied only by the sum torque command of the front wheel torque command and the rear wheel torque command.

In short, according to a drive system torque control method according to an exemplary embodiment of the present disclosure, when coasting deceleration driving of the vehicle is performed after tip-out of the accelerator pedal, while the front wheel torque command passes through the backlash band (during the backlash control of the front wheel torque command), torque correction control is performed to control the slope of the front wheel torque command, and at the same time, an additional braking torque command is generated to perform torque compensation control that compensates for insufficient braking torque by friction braking torque.

Furthermore, after start of backlash control and until a point at which friction braking torque interference end portions (a point at which the braking torque command becomes 0 torque), blend-over control is performed to properly mix the front wheel torque command (regenerative braking torque command), rear wheel torque command (maintained as the minimum torque threshold value), and the braking torque command (friction braking torque command) so that sum torque thereof may satisfy the total torque command, which is the pre-distribution torque command.

As described above, when the front wheel torque command, the rear wheel torque command, and the braking torque command are determined in real time after accelerator pedal tip-out, the controller 20 is configured to control operations of the front wheel motor 31, the rear wheel motor 41, and the friction braking device 50 according to respective commands (step S7 in FIG. 3).

Meanwhile, a detailed description will be provided of the drive system torque control method performed when the driver tips-in the accelerator pedal again after tip-out in which the driver releases the foot from the accelerator pedal.

FIG. 6, FIG. 7, FIG. 8, and FIG. 9 are diagrams illustrating a drive system torque control state during tip-in after tip-out of the accelerator pedal in an exemplary embodiment of the present disclosure. FIG. 6, FIG. 7, FIG. 8, and FIG. 9 each illustrate a torque command when the driver tips-in again after tip-out while depressing the accelerator pedal.

FIG. 6, FIG. 7, FIG. 8, and FIG. 9 each illustrate a method of determining a torque command in four examples in which time intervals after tip-out and until tip-in again are varied and a state of the front wheel torque command and a state of the sum torque command (pre-distribution torque command and total torque command) are differently combined during tip-in.

Figure 6:
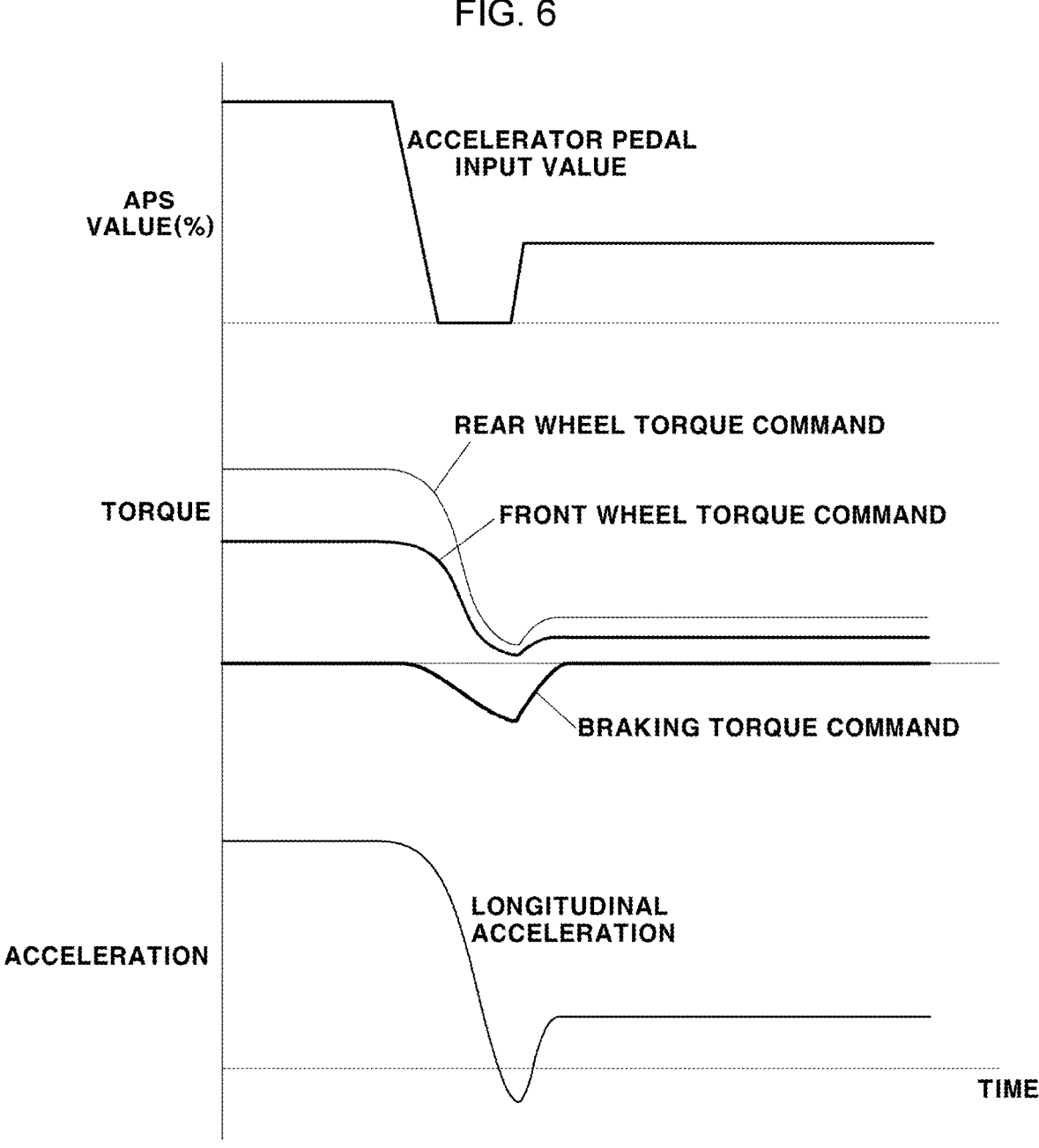
FIG. 6, FIG. 7, FIG. 8, and FIG. 9 are diagrams illustrating a drive system torque control state during tip-in after tip-out of an accelerator pedal in an exemplary embodiment of the present disclosure.

First, FIG. 6 illustrates an example in which the value of the front wheel torque command is a positive (+) value and the value of the sum torque command is also a positive (+) value during tip-in after tip-out. During tip-in, the value of the sum torque command is a torque value obtained by summing the front wheel torque command, the rear wheel torque command, and the braking torque command.

In the example of FIG. 6, the rear wheel torque command during tip-in may be in a state in which the minimum torque threshold value has been reached by the controller 20. Furthermore, by the controller 20, during tip-in, the front wheel torque command enters the backlash band. At the instant time, the braking torque command has previously been generated, and friction braking torque is being generated. Furthermore, the braking torque command has previously interfered with the sum torque command.

In the example of FIG. 6, from the time when tip-out of the accelerator pedal is performed, the rear wheel torque command decreases until reaching the minimum torque threshold value. Thereafter, when the accelerator pedal is tip-in, so that the sum torque command includes a positive (+) value and the front wheel torque command includes a positive (+) value at the same time, the controller 20 immediately sets the braking torque command to 0 torque, suspending generation of the braking torque command.

Accordingly, after tip-in of the accelerator pedal, the operation of the friction braking device 50 is suspended so that friction braking torque is not generated. Furthermore, after tip-in of the accelerator pedal, the total torque command is satisfied by the sum of the front wheel torque command and the rear wheel torque command in a state where interference of friction braking torque is suspended. Ultimately, the required torque may be satisfied only by the driving torque of the front wheel motor and the driving torque of the rear wheel motor.

Referring to FIG. 6, it may be seen that, after tip-in of the accelerator pedal, in a state where the sum torque command is a positive (+) value, longitudinal acceleration of the vehicle is switched to a positive (+) value, accelerating the vehicle.

Figure 7:
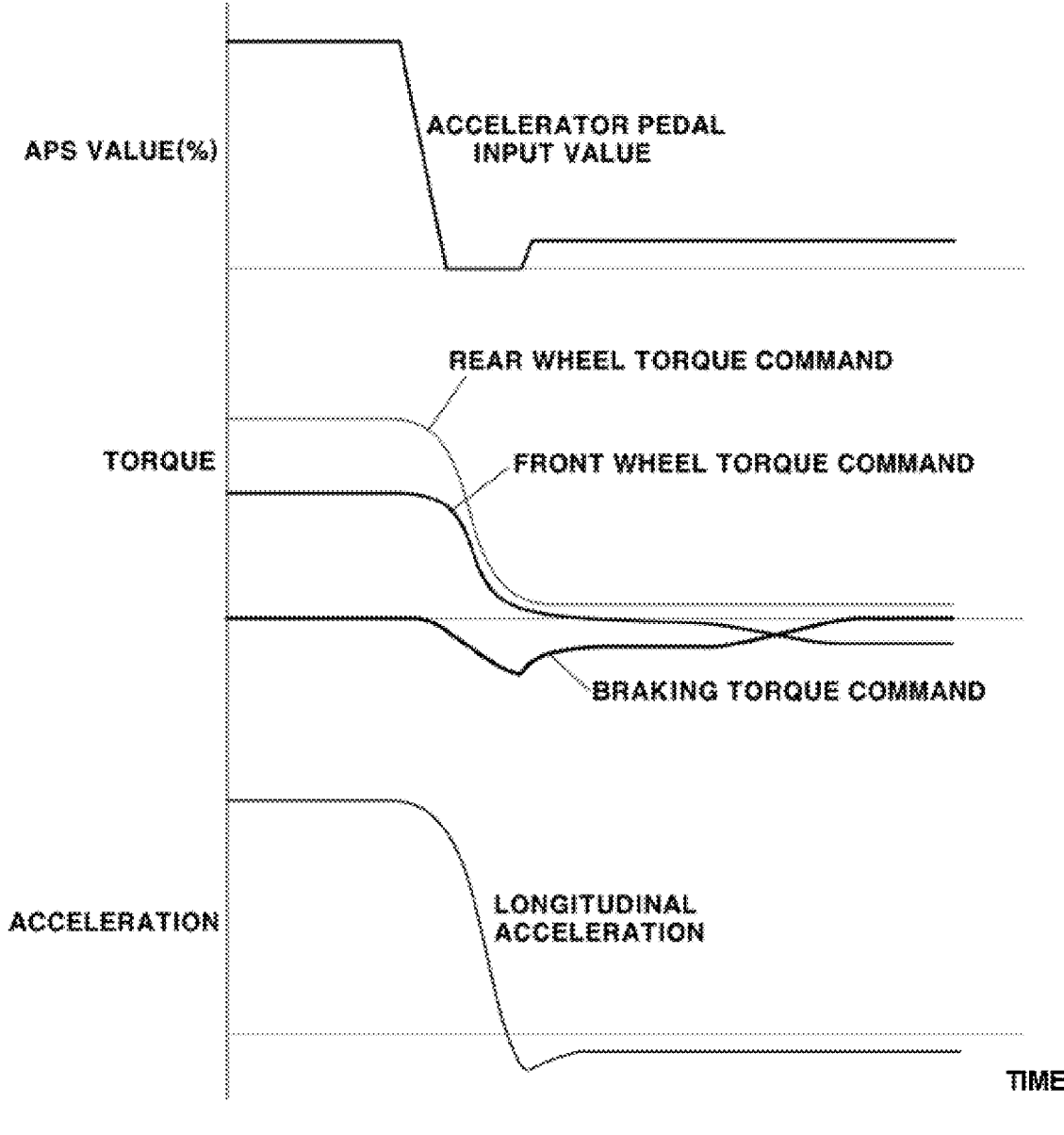

Next, FIG. 7 shows an example in which the value of the front wheel torque command is a positive (+) value, and the value of the sum torque command is a negative (–) value during tip-in after tip-out. Referring to FIG. 7, during tip-in of the accelerator pedal, the longitudinal acceleration of the vehicle indicates a negative (–) value, and at the instant time, the value of the sum torque command is a negative (–) value.

In the example of FIG. 7, a value of the sum torque command is a torque value obtained by summing the front wheel torque command, the rear wheel torque command, and the braking torque command.

In the example of FIG. 7, the rear wheel torque command during tip-in has reached the minimum torque threshold value, and the front wheel torque command during tip-in has entered the backlash band. At the instant time, the braking torque command has previously been generated so that friction braking torque is generated, and the braking torque command has previously interfered with the sum torque command.

In the example of FIG. 7, during tip-in, the sum torque command obtained by summing the rear wheel torque command maintaining the minimum torque threshold value, the front wheel torque command in the backlash band, and the braking torque including a negative (−) torque value, includes a negative (−) value.

In the example of FIG. 7, from the time when tip-out of the accelerator pedal is performed, the controller 20 reduces the rear wheel torque command until reaching the minimum torque threshold value. Thereafter, even when tip-in of the accelerator pedal is performed, the rear wheel torque command is continuously maintained at the minimum torque threshold value as long as the sum torque command includes a negative (−) value.

Furthermore, while the braking torque command is being applied after tip-out, when the direction of the front wheel torque command is a positive (+) value, and the sum torque command is a negative (−) value, the controller 20 continuously generates the braking torque command to maintain generation of the friction braking torque.

Thereafter, when the front wheel torque command is determined to have become a negative (−) torque value completely escaping the backlash band after passing through the backlash band, the controller 20 is configured to perform blend-over control to change the braking torque command (which is negative torque) at a positive (+) slope until becoming zero torque, and change the front wheel torque command (which is regenerative braking torque) at a negative (−) slope in the opposite direction thereof.

That is, the front wheel torque command is changed at a negative (−) slope to increase the regenerative braking torque of the front wheels, and the braking torque command is changed at a positive (+) slope to decrease the friction braking torque at a same time.

Furthermore, generation and interference of the braking torque command are suspended by making the braking torque command become 0 torque, and then the operation of the friction braking device 50 is suspended so that the friction braking torque is not generated.

As a result, the sum torque command is satisfied by the sum of the front wheel torque command, the rear wheel torque command, and the braking torque command. However, after blend-over, in a state where the braking torque command becomes 0 torque, the sum torque command may be satisfied only by the front wheel torque command and the rear wheel torque command.

Figure 8:
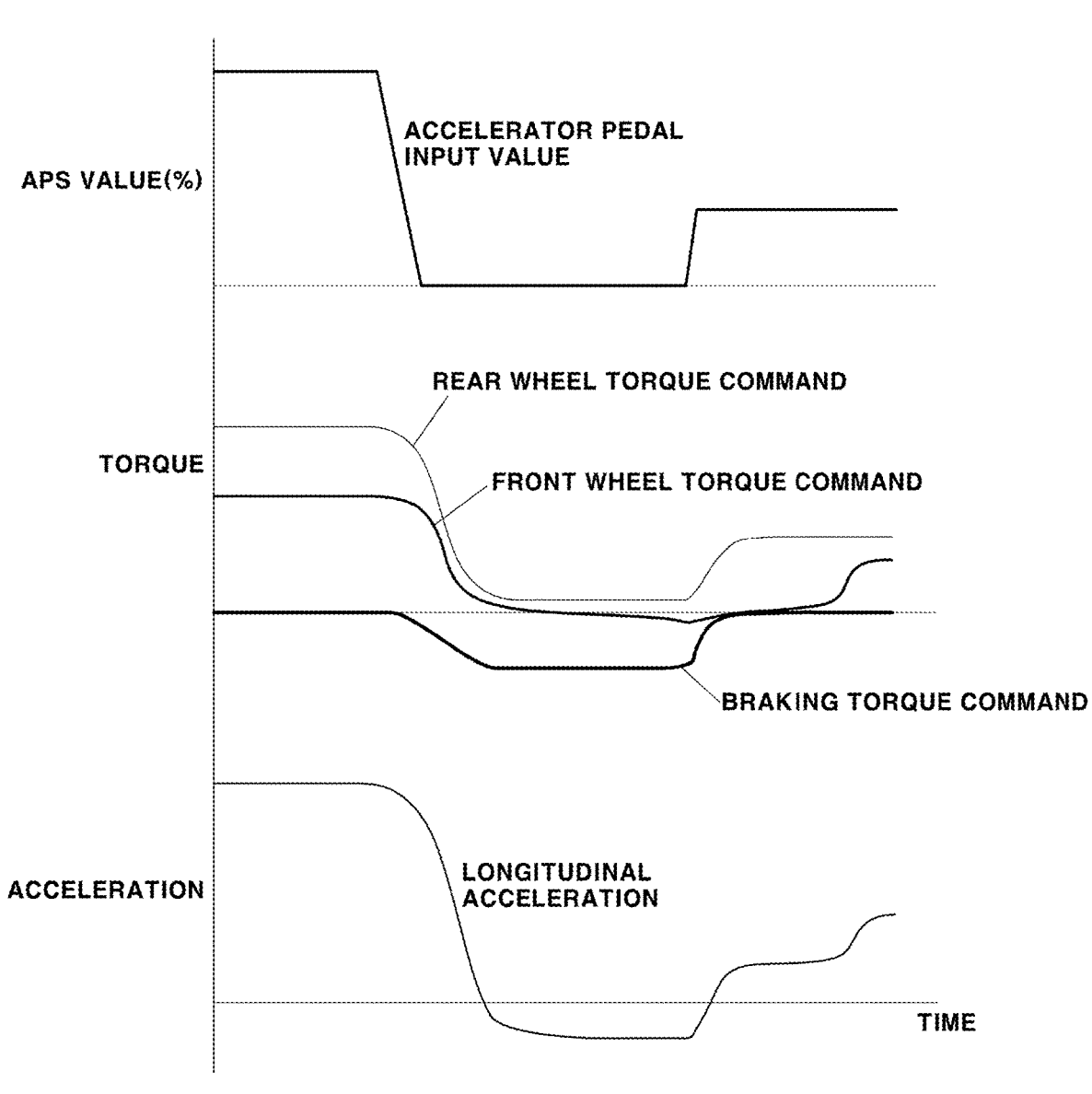

Next, FIG. 8 shows an example in which the value of the front wheel torque command is a negative (−) value and the value of the sum torque command is a positive (+) value during tip-in after tip-out. The value of the sum torque command is the torque value obtained by summing the front wheel torque command, the rear wheel torque command, and the braking torque command.

In the example of FIG. 8, upon tip-out of the accelerator pedal, the controller 20 reduces the rear wheel torque command to the minimum torque threshold value and then maintains the value, and is configured to perform backlash control for switching the front wheel torque command from a positive (+) torque value to a negative (−) torque value by passing through the backlash band.

Furthermore, the controller 20 generates the braking torque command to compensate for insufficient braking torque during coasting deceleration after tip-out. Accordingly, the friction braking device 50 applies additional braking torque according to the braking torque command.

Thereafter, tip-in of the accelerator pedal is performed while the braking torque is applied, and when the front wheel torque command is a negative (−) value and the sum torque command is a positive (+) value during tip-in, the controller 20 sets the braking torque command to 0 torque to first suspend interference of the friction braking torque.

Furthermore, during tip-in, the controller 20 is configured to perform backlash control for switching the front wheel torque command from a negative (−) torque value to a positive (+) torque value by passing through the backlash band. Thereafter, while the accelerator pedal is depressed by the driver, the front wheel torque command passing through the backlash band converges on a value distributed from the sum torque command (total torque command).

Furthermore, thereafter, the rear wheel torque command is determined as a torque value obtained by subtracting the sum of the front wheel torque command and the braking torque command (which converges on a value of 0 torque after the time of tip-in) from the sum torque command.

Figure 9:
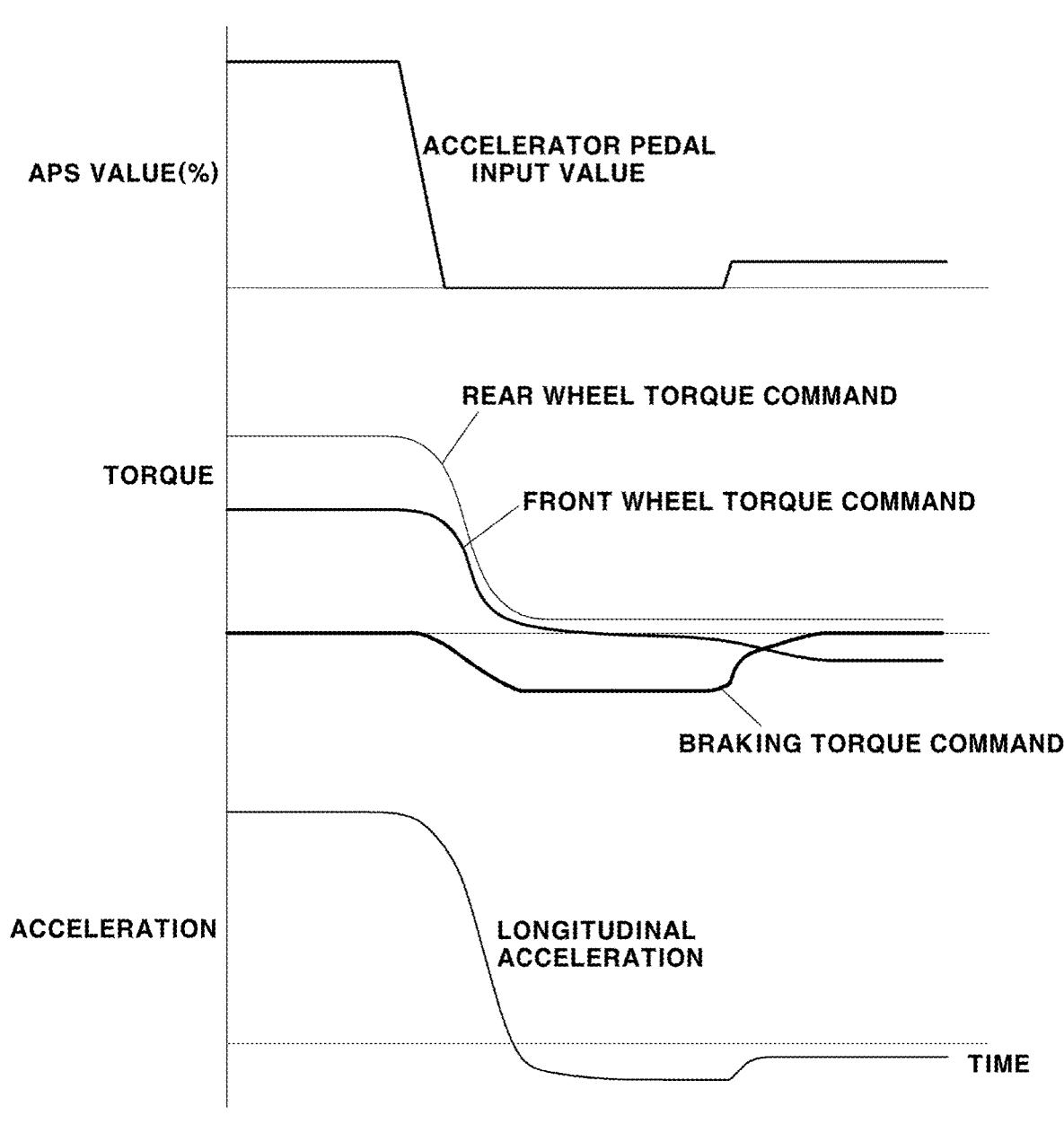

Next, FIG. 9 shows an example in which the value of the front wheel torque command is a negative (−) value and the value of the sum torque command is a negative (−) value during tip-in after tip-out. Here, the value of the sum torque command is a torque value obtained by summing the front wheel torque command, the rear wheel torque command, and the braking torque command during tip-in.

In the example of FIG. 9, upon tip-out of the accelerator pedal, the controller 20 reduces the rear wheel torque command to the minimum torque threshold value and then maintains the value, and is configured to perform backlash control for switching the front wheel torque command from a positive (+) torque value to a negative (−) torque value by passing through the backlash band.

Furthermore, the controller 20 generates a braking torque command to compensate for insufficient braking torque during coasting deceleration after tip-out. Accordingly, the friction braking device 50 additionally generates and applies necessary braking torque according to the braking torque command.

Thereafter, tip-in of the accelerator pedal is performed while the braking torque is applied, and when the front wheel torque command is a negative (−) value and the sum torque command is a negative (−) value during tip-in, the controller 20 is first configured to perform blend-over control on the front wheel torque command and the braking torque command.

Referring to FIG. 9, it may be seen that the longitudinal acceleration of the vehicle is a negative (−) value during tip-in of the accelerator pedal. At the instant time, the sum torque command is a negative (−) value.

During blend-over control, the controller 20 changes the braking torque command (negative torque value) at a positive (+) slope so that the braking torque command becomes a value of 0 torque, and increases the regenerative braking torque of the front wheels by changing the front wheel torque command (regenerative torque command) passing through the backlash band at a negative (−) slope on the other hand.

The controller 20 maintains the rear wheel torque command at the minimum torque threshold value even after tip-in of the accelerator pedal, and allows the sum of the front wheel torque command, the braking torque command, and the rear wheel torque command maintained as the minimum torque threshold value to satisfy the sum torque command during blend-over control.

Furthermore, when the braking torque command becomes 0 torque and the interference of the friction braking torque is suspended, the sum torque command is satisfied only by the sum of the front wheel torque command and the rear wheel torque command obtained as a result of the front wheel and rear wheel torque distribution.

Figure 10:
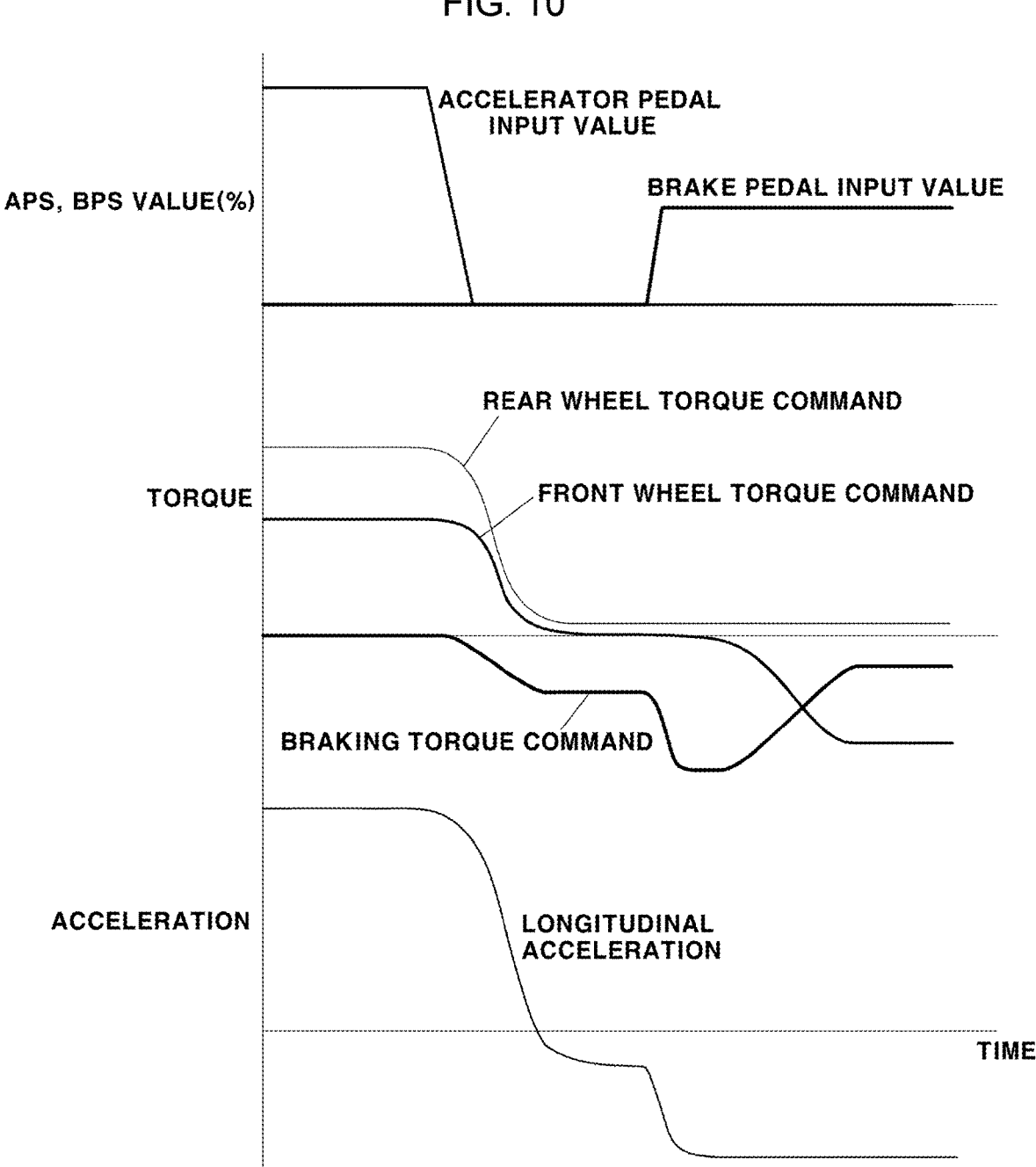
FIG. 10, and FIG. 11 are diagrams each illustrating a torque control state when a brake pedal is applied after tip-out of the accelerator pedal in an exemplary embodiment of the present disclosure.
Figure 11:
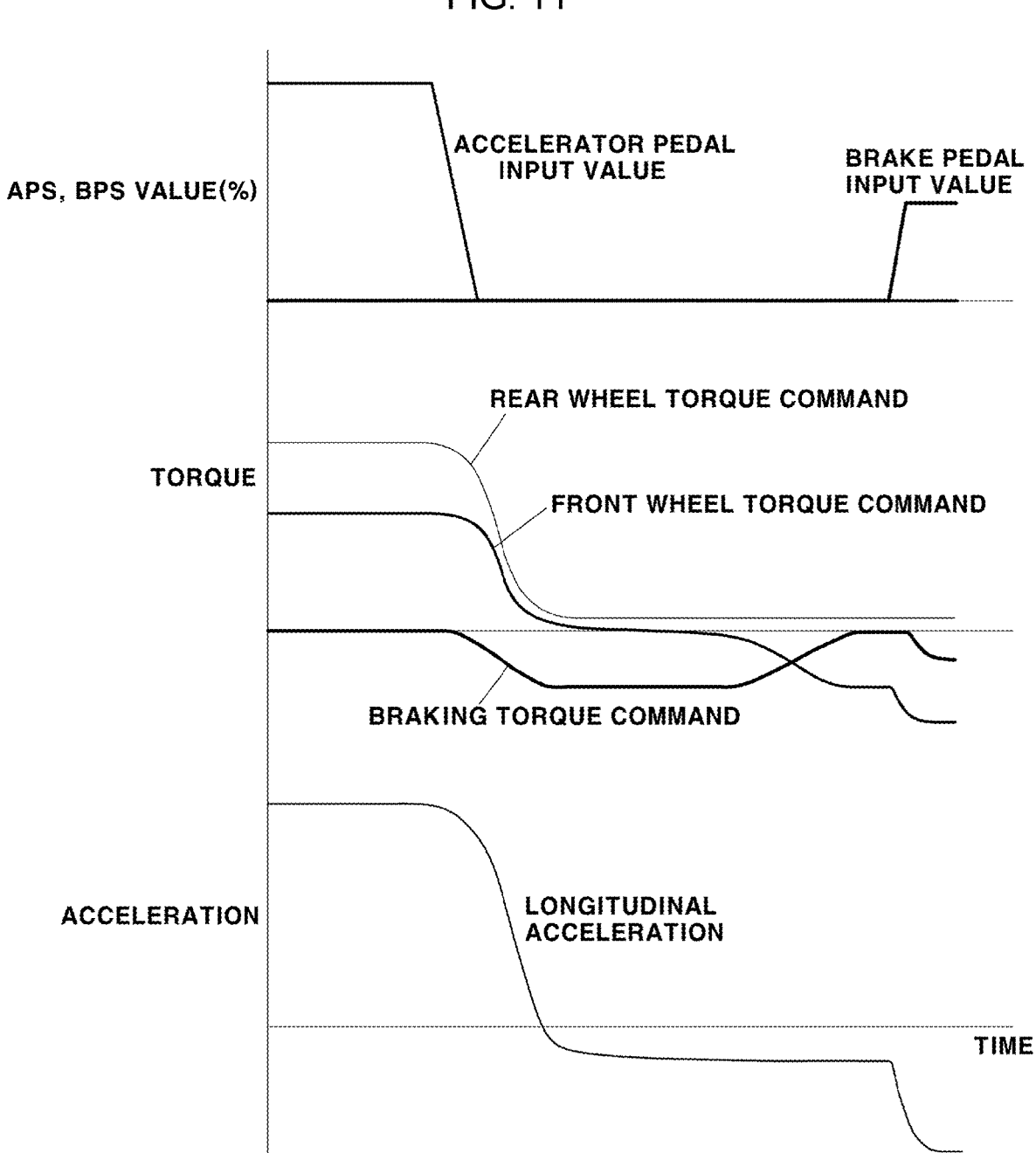

Meanwhile, FIG. 10, and FIG. 11 are diagrams each illustrating a torque control state when the brake pedal is applied after tip-out of the accelerator pedal, and illustrate examples in which the brake pedal is applied before and after the front wheel torque command passes through the backlash band, respectively, after tip-out of the accelerator pedal.

As illustrated in FIG. 10, while the driver depresses the accelerator pedal, the controller 20 is configured to determine the total torque command based on the accelerator pedal input value, and then is configured to determine the front wheel torque command (having a positive torque value) and the rear wheel torque command (having a positive torque value) through the front wheel and rear wheel torque distribution process from the total torque command.

Thereafter, upon tip-out, the controller 20 reduces the rear wheel torque command to the minimum torque threshold value and maintains the value, and is configured to perform backlash control for switching the front wheel torque command from a positive (+) torque value to a negative (−) torque value by passing through the backlash band.

Furthermore, the controller 20 generates the braking torque command to compensate for insufficient braking torque during coasting deceleration after tip-out. Accordingly, the friction braking device 50 additionally generates and applies necessary braking torque according to the braking torque command.

As described above, when the driver depresses the brake pedal in a state where the front wheel torque command is a positive (+) value while the braking torque is being applied, especially while the front wheel torque command is passing through the backlash band, the controller 20 first additionally generates friction braking torque by rapidly changing the braking torque command at a negative slope to satisfy the total braking torque corresponding to the brake pedal input value while the front wheel torque command passes through the backlash band.

While the front wheel torque command passes through the backlash band, the remaining required torque that cannot be allotted by the regenerative braking torque of the front wheels may be allotted using friction braking torque generated by the friction braking device (50, for example, the rear wheel friction braking device) according to the braking torque command.

Thereafter, upon determining that the front wheel torque command passes through the backlash band and completely enters a negative (−) torque region, the controller 20 is configured to perform blend-over control to change the braking torque command at a positive (+) slope and reversely change the front wheel torque command at a negative (−) slope at the same time.

As a result, the total torque command may be satisfied by the sum of the front wheel torque command, the braking torque command, and the rear wheel torque command maintained at the minimum torque threshold value, and the total braking torque may be satisfied by the regenerative braking torque of the front wheels and the friction braking torque of the friction braking device (50, for example, the rear wheel friction braking device).

However, when the total torque command, that is, the front wheel torque command required to satisfy the total braking torque exceeds a maximum regenerative limit of the front wheels, or when the braking force needs to be distributed to the rear wheels from a safety point of view, the remaining required torque that cannot be allotted by the regenerative braking torque of the front wheels is allotted using the friction braking torque generated by the friction braking device (50, for example, the rear wheel friction braking device) according to the braking torque command.

Next, FIG. 11 illustrates an example in which the brake pedal is input after the front wheel torque command passes through the backlash band after tip-out of the accelerator pedal.

As illustrated in FIG. 11, the controller 20 is configured to determine the total torque command based on the accelerator pedal input value while the driver depresses the accelerator pedal, and then is configured to determine the front wheel torque command (having a positive torque value) and the rear wheel torque command (having a positive torque value) from the total torque command through the front wheel and rear wheel torque distribution process.

Thereafter, upon tip-out, the controller 20 reduces the rear wheel torque command to the minimum torque threshold value and maintains the value, and is configured to perform backlash control for switching the front wheel torque command from a positive (+) torque value to a negative (−) torque value by passing through the backlash band.

While the front wheel torque command passes through the backlash band, the remaining required torque that cannot be allotted by the regenerative braking torque of the front wheels may be allotted using friction braking torque generated by the friction braking device (50, for example, the rear wheel friction braking device) according to the braking torque command.

Furthermore, the controller 20 generates the braking torque command to compensate for insufficient braking torque during coasting deceleration after tip-out. Accordingly, the friction braking device 50 additionally generates and applies necessary braking torque according to the braking torque command.

Thereafter, when the front wheel torque command passes through the backlash band and completely enters a negative (−) torque region, the controller 20 is configured to perform blend-over control on the braking torque command and the front wheel torque command.

That is, the controller 20 changes the braking torque command at a positive (+) slope until becoming 0 torque, and changes the front wheel torque command at a negative (−) slope in the opposite direction to increase the regenerative braking torque of the front wheels of the vehicle.

Furthermore, in the case where the driver depresses the brake pedal when the front wheel torque command passes through the backlash band to indicate a negative (−) torque value, the front wheel torque command is changed at a negative (−) slope to first generate the regenerative braking torque of the front wheels, satisfying the total braking torque, which is the required torque.

However, when the total torque command, that is, the front wheel torque command required to satisfy the total braking torque, exceeds a maximum regenerative limit of the front wheels, or when the braking force needs to be distributed to the rear wheels from a safety point of view, the remaining required torque that cannot be allotted by the regenerative braking torque of the front wheels is allotted using the friction braking torque generated by the friction braking device (50, for example, the rear wheel friction braking device) according to the braking torque command.

In the present way, the drive system torque control method according to the exemplary embodiment of the present disclosure has been described in detail., according to an exemplary embodiment of the present disclosure described above, the backlash band evasion control of the drive system is executed, and motor control specialized for the high-performance driving mode is performed, so that occurrence of backlash itself may be prevented., because the motor is used only in a torque range irrelevant to backlash, backlash vibration and noise impact problems may be effectively solved.

Furthermore, because driving force may be generated without concern about backlash problems, longitudinal responsiveness of the vehicle may be greatly improved. A driving mode emphasizing direct connection for high-performance electric vehicles may be provided, convenience and accuracy of load movement control when turning on a track may be improved, and ease of use of a special driving mode such as a drift mode may be improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling torque of a drive system of a vehicle, the method comprising:

determining, by a controller, a required torque according to a vehicle driving state while the vehicle is driven, and determining, by the controller, a total torque command based on the determined required torque; and performing, by the controller, a front wheel and rear wheel torque distribution process on the total torque command, so that a front wheel torque command and a rear wheel torque command following the total torque command are determined, wherein the controller is configured to:

perform a backlash control for limiting a torque slope of the front wheel torque command while the front wheel torque command passes through a backlash band, which is a torque region where there is possibility that backlash occurs in a front wheel-side drive system; and generate a braking torque command for generating a friction braking torque while the backlash control is performed, wherein a maximum permissible change rate in the backlash band of the front wheel torque command is set in the controller; and wherein, in the controller, the maximum permissible change rate in the backlash band of the front wheel torque command is set to a value not causing backlash impact in the front wheel-side drive system.

2. The method of claim 1, wherein the backlash band of the front wheel-side drive system is set to a torque range including 0 torque while bordering a lower limit threshold value, which is a negative (−) value, and an upper limit threshold value, which is a positive (+) value.

3. The method of claim 1, wherein in the controller, the rear wheel torque command is determined as a value greater than or equal to a minimum torque threshold value, which is a preset positive (+) torque value, and wherein the minimum torque threshold value is set in the controller to a value greater than an upper limit threshold value of a backlash band, which is a torque region where there is possibility that backlash occurs in a rear wheel-side drive system.

4. The method of claim 3, wherein the controller is configured to:

compare the total torque command and the minimum torque threshold value, and determine the rear wheel torque command as the minimum torque threshold value when the total torque command is less than or equal to the minimum torque threshold value;

allow a sum of the rear wheel torque command, the front wheel torque command, and the braking torque command to follow the total torque command while the front wheel torque command passes through the backlash band; and suspend generation of the braking torque command after the front wheel torque command passes through the backlash band, so that a sum of the rear wheel torque command and the front wheel torque command follows the total torque command.

5. The method of claim 3, wherein the backlash band of the rear wheel-side drive system is set to a torque range including 0 torque while bordering a lower limit threshold value, which is a negative (−) value, and an upper limit threshold value, which is a positive (+) value.

6. The method of claim 3, wherein, in response that an ON state of a backlash band evasion mode is selected and input by a driver, the controller is configured to:

perform the backlash control of the front wheel torque command;

generate a braking torque command for generating the friction braking torque; and maintain the rear wheel torque command at a value equal to or greater than the minimum torque threshold value.

7. The method of claim 1, wherein the front wheel torque command is determined as a positive (+) torque value or a negative (−) torque value obtained by subtracting the rear wheel torque command and the braking torque command from the total torque command.

8. The method of claim 1, wherein the braking torque command is a braking torque command of a rear wheel friction braking device that applies the friction braking torque to rear wheels of the vehicle.

9. The method of claim 3, wherein a driving input value is an accelerator pedal input value, and wherein in response that an accelerator pedal of the vehicle is disposed in a tip-out state while a driver depresses the accelerator pedal, the controller is configured to:

perform the backlash control of the front wheel torque command;

generate a braking torque command for generating the friction braking torque; and maintain the rear wheel torque command at a value equal to or greater than the minimum torque threshold value.

10. The method of claim 9, wherein, in response that the accelerator pedal is disposed in the tip-out state from a depressed state, the controller is configured to switch the front wheel torque command from a positive (+) torque value to a negative (−) torque value so that the front wheel torque command passes through the backlash band.

11. The method of claim 10, wherein the controller is configured to limit the torque slope of the front wheel torque command to the maximum permissible change rate while performing the backlash control.

12. The method of claim 9, wherein, in response that the accelerator pedal tips in again after tipping out by the driver, and in response that a value of the front wheel torque command is a positive (+) value and a value of the total torque command is a positive (+) value, the controller is configured to perform an operation to set the braking torque command to 0 torque to suspend generation of the braking torque command, and allow the total torque command to be satisfied by a sum of the front wheel torque command and the rear wheel torque command.

13. The method of claim 9, wherein, in response that the accelerator pedal tips in again after tipping out by the driver, and in response that a value of the front wheel torque command is a positive (+) value and a value of the total torque command is a positive (+) value, the controller is configured to perform an operation to:

determine the rear wheel torque command as a value equal to or greater than the minimum torque threshold value, which is a preset positive (+) torque value; and set the braking torque command to 0 torque to suspend generation of the braking torque command, and then allow the total torque command to be satisfied by a sum of the front wheel torque command and the rear wheel torque command when the front wheel torque command passes through the backlash band and becomes a negative (−) value.

14. The method of claim 9, wherein, in response that the accelerator pedal tips in again after tipping out by the driver, and in response that a value of the front wheel torque command is a negative (−) value and a value of the total torque command is a positive (+) value, the controller is configured to perform an operation to:

set the braking torque command to 0 torque to suspend generation of the braking torque command; and allow the total torque command to be satisfied by a sum of the front wheel torque command and the rear wheel torque command.

15. The method of claim 9, wherein, in response that the accelerator pedal tips in again after tipping out by the driver, and in response that a value of the front wheel torque command is a negative (−) value and a value of the total torque command is a negative (−) value, the controller is configured to perform an operation to:

determine the rear wheel torque command as a value equal to or greater than the minimum torque threshold value, which is a preset positive (+) torque value; and set the braking torque command to 0 torque to suspend generation of the braking torque command, and then allow the total torque command to be satisfied by a sum of the front wheel torque command and the rear wheel torque command.

16. The method of claim 9, wherein, in response that a brake pedal is applied while the front wheel torque command passes through the backlash band after tip-out of the accelerator pedal by the driver, the controller is configured to change the braking torque command at a negative (−) slope to additionally generate the friction braking torque so that a total braking torque corresponding to a brake pedal input value is allowed to be satisfied.

17. The method of claim 16, wherein the controller is configured to:

determine the rear wheel torque command as a value equal to or greater than the minimum torque threshold value, which is a preset positive (+) torque value, after tip-out of the accelerator pedal; and change the braking torque command at a positive (+) slope to decrease the friction braking torque, and changes the front wheel torque command at a negative (−) slope to increase regenerative braking torque of front wheels in the vehicle when the front wheel torque command becomes negative (−) torque after passing through the backlash band.

18. The method of claim 9, wherein, in response that a brake pedal is applied by the driver when the front wheel torque command is a negative (−) torque value after passing through the backlash band after tip-out of the accelerator pedal, the controller is configured to:

determine the rear wheel torque command as the minimum torque threshold value, which is a preset positive (+) torque value; and change the front wheel torque command at a negative (−) slope to satisfy total braking torque by a regenerative braking torque of front wheels of the vehicle.

19. The method of claim 18, wherein the controller is configured to generate the regenerative braking torque of the front wheels to satisfy the total braking torque and to generate a braking torque command to additionally generate friction braking torque at a same time.

* * * * *